United States Patent
Murashige et al.

(10) Patent No.: US 11,834,288 B2
(45) Date of Patent: Dec. 5, 2023

(54) METHOD FOR CONVEYING GLASS FILM COMPOSITE

(71) Applicant: Nitto Denko Corporation, Ibaraki (JP)

(72) Inventors: Takeshi Murashige, Osaka (JP); Junichi Inagaki, Osaka (JP); Keisuke Sato, Osaka (JP); Atsushi Kishi, Osaka (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 17/598,606

(22) PCT Filed: Mar. 11, 2020

(86) PCT No.: PCT/JP2020/010553
§ 371 (c)(1),
(2) Date: Sep. 27, 2021

(87) PCT Pub. No.: WO2020/203125
PCT Pub. Date: Oct. 8, 2020

(65) Prior Publication Data
US 2022/0144574 A1      May 12, 2022

(30) Foreign Application Priority Data

Mar. 29, 2019  (JP) ................ 2019-066164

(51) Int. Cl.
*B65H 20/02*   (2006.01)
*B32B 17/10*   (2006.01)
*B65H 18/10*   (2006.01)

(52) U.S. Cl.
CPC ............. *B65H 20/02* (2013.01); *B32B 17/10* (2013.01); *B65H 18/103* (2013.01);
(Continued)

(58) Field of Classification Search
None
See application file for complete search history.

(56) References Cited

U.S. PATENT DOCUMENTS

2012/0023779 A1   2/2012 Sato et al.
2012/0156439 A1   6/2012 Mori et al.
(Continued)

FOREIGN PATENT DOCUMENTS

CN     102905891 A    1/2013
CN     104203779 A    12/2014
(Continued)

OTHER PUBLICATIONS

Office Action dated Sep. 30, 2022, issued in counterpart CN application No. 202080024246.6 with English translation. (16 pages).
(Continued)

*Primary Examiner* — William A. Rivera
(74) *Attorney, Agent, or Firm* — WHDA, LLP

(57) ABSTRACT

A method of conveying a glass film composite uses a roll-to-roll process for winding a glass film composite wound on a feed roller by a winding roller through a plurality of conveyance rollers. The glass film composite includes an elongated glass film, and linear resin tapes disposed on one side of the glass film along a longitudinal direction of the glass film at both ends in a width direction of the glass film. The method includes a step of conveying the glass film composite from the feed roller to the winding roller through the plurality of conveyance rollers without passing a state in which the glass film composite is bent so that the resin tapes are directed to the inside.

8 Claims, 4 Drawing Sheets

(52) U.S. Cl.
CPC .. *B65H 2301/5121* (2013.01); *B65H 2404/11* (2013.01); *B65H 2511/13* (2013.01)

(56) References Cited

U.S. PATENT DOCUMENTS

| | | | |
|---|---|---|---|
| 2013/0134202 A1 | 5/2013 | Garner et al. | |
| 2013/0236675 A1* | 9/2013 | Garner | B65H 19/1852 83/14 |
| 2017/0190155 A1* | 7/2017 | Gopalakrishnan | B32B 17/10779 |
| 2019/0270663 A1 | 9/2019 | Murashige et al. | |
| 2019/0322079 A1 | 10/2019 | Murashige et al. | |
| 2021/0138764 A1* | 5/2021 | Murashige | C09J 7/38 |
| 2021/0163333 A1* | 6/2021 | Mori | C03B 17/064 |
| 2022/0219440 A1* | 7/2022 | Inagaki | C09J 5/00 |

FOREIGN PATENT DOCUMENTS

| | | |
|---|---|---|
| CN | 104520218 A | 4/2015 |
| EP | 2 332 856 A1 | 6/2011 |
| EP | 2 336 050 A1 | 6/2011 |
| EP | 3 533 605 A1 | 9/2019 |
| EP | 3 533 772 A1 | 9/2019 |
| JP | 2012-1405 A | 1/2012 |
| JP | 2014-8698 A | 1/2014 |
| JP | 2015-511204 A | 4/2015 |
| JP | 2015-174694 A | 10/2015 |
| JP | 2018-199580 A | 12/2018 |
| WO | 2018/079546 A1 | 5/2018 |
| WO | 2018079545 A1 | 5/2018 |

OTHER PUBLICATIONS

International Search Report dated Jun. 2, 2020, issued in counterpart International application No. PCT/JP2020/010553, with English translation. (5 pages).

Japanese Written Opinion dated Jun. 2, 2020, issued in counterpart International application No. PCT/JP2020/010553 (3 pages).

Extended (Supplementary) European Search Report dated Mar. 28, 2022, issued in counterpart EP application No. 20784975.3. (10 pages).

Office Action dated Sep. 30, 2022, issued in counterpart CN application No. 202080024246.6 with English translation. (18 pages).

Office Action dated Jun. 17, 2023, issued in counterpart CN application No. 202080024246.6, with English translation. (14 pages).

* cited by examiner (a)

(b)

(c)

METHOD FOR CONVEYING GLASS FILM COMPOSITE

TECHNICAL FIELD

The present invention relates to a method of conveying a glass film composite.

BACKGROUND ART

Glass films are attracting attention in the field of optical devices, in which reduction of thicknesses and weights of devices are advanced, according to transparency, dimensional stability, and barrier property of glass and flexibility of film. Moreover, glass films can be adapted to roll-to-roll processes. Thus, the glass films have potential to dramatically improve the productivity.

On the other hand, glass films are fragile. There is a problem of handling. In the case where a minute crack is present at an edge of a glass film, when the glass film is bent, the glass film is broken from the crack. For the above-described problem, various conveyance methods have been proposed to suppress breakage of glass films.

PRIOR ART DOCUMENTS

Patent Documents

[Patent Document 1] Japanese Laid-open Patent Publication No. 2012-001405

SUMMARY OF INVENTION

Problem to be Solved by the Invention

There are various types of glass films. Furthermore, there are glass film composites in which glass films are provided with breakage prevention members. However, methods of suitably conveying such glass film composites in a roll-to-roll process have not been established.

The present invention has been made in view of the above problem, and it is an object of the present invention to provide a method of conveying a glass film composite provided with a predetermined breakage prevention member in a roll-to-roll process, while suppressing breakage of the glass film.

Means for Solving Problems

According to an aspect of the present invention, a method of conveying a glass film composite uses a roll-to-roll process for winding a glass film composite wound on a feed roller by a winding roller through a plurality of conveyance rollers. The glass film composite includes an elongated glass film, and linear resin tapes disposed on one side of the glass film along a longitudinal direction of the glass film at both ends in a width direction of the glass film. The method includes a step of conveying the glass film composite from the feed roller to the winding roller through the plurality of conveyance rollers without passing a state in which the glass film composite is bent so that the resin tapes are directed to the inside.

Effects of the Invention

According to the disclosure of the present application, it is possible to suppress breakage of a glass film, when a glass film composite provided with a predetermined breakage prevention member is conveyed using a roll-to-roll process.

MODE FOR CARRYING OUT THE INVENTION

Figure 1:
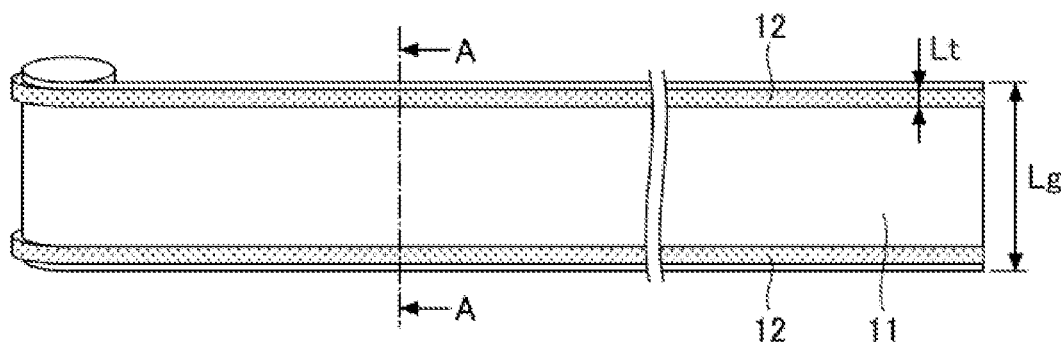
FIG. 1 is a diagram schematically depicting an example of a glass film composite to be conveyed.
Figure 1:
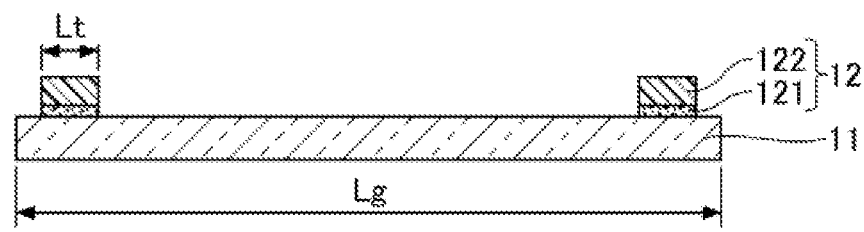
Figure 1:
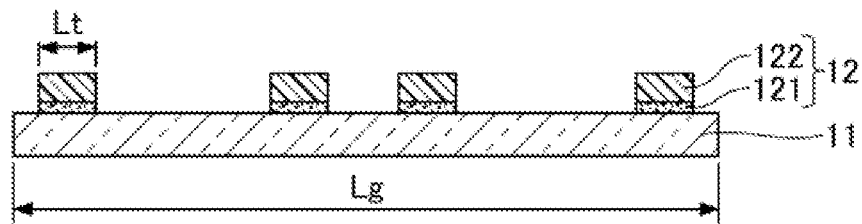

In the following, an embodiment for carrying out the invention will be described with reference to the drawings. In each drawing, the same reference numerals are assigned to the same components, respectively, and overlapping descriptions may be omitted.

First Embodiment

[Glass Film Composite]

The glass film composite to be conveyed will be described first. FIG. 1 is a diagram schematically depicting an example of the glass film composite to be conveyed. FIG. 1(a) is an overall view of the glass film composite, and FIG. 1(b) is a cross-sectional view of the glass film composite cut along a line "A-A" of FIG. 1(a) in an enlarged. FIG. 1(c) is a cross-sectional view of a glass film composite according to another embodiment, in which four linear resin tapes are disposed on one side of the glass film.

Referring to FIG. 1, a glass film composite 10 includes an elongated glass film 11 and a plurality of resin tapes 12 disposed on one side of the glass film 11.

In the specification of the present application, the term "elongated" means a long and narrow shape in which a length is sufficiently large compared with the width. For example, the elongated shape includes a long and narrow shape in which the length is ten or more times the width.

The length of the glass film composite 10 is preferably 50 m or more, more preferably 100 m or more, and further preferably 500 m or more. Because the glass film 11 in the glass film composite 10 can be effectively prevented from being broken, it is possible to handle the glass film 11 having a length which was unable to be continuously manufactured or processed in the related art (e.g. 500 m or more). The upper limit of the length of the glass film composite 10 is not particularly limited, and is, for example, 1000 m.

The width of the glass film composite 10 (the same as the width Lg of the glass film 11) is preferably within a range from 100 mm to 5000 mm, more preferably within a range from 200 mm to 3000 mm, and further preferably within a range from 500 mm to 2000 mm. The glass film composite 10 is provided in a form of a roll.

The glass film 11 is provided for use after removing the portions on which the resin tapes 12 are disposed and outer portions thereof. For example, another layer (e.g. an optical film such as a polarizing plate, a highly heat-resistant film such as a transparent polyimide, or a light modulation film such as a polymer dispersed liquid crystal (PDLC)) is laminated on the glass film composite 10 to form a laminate body having a predetermined strength. Then, the portion on which the resin tapes 12 are disposed and outer portion thereof are removed by slits or the like, and thereby a laminate body provided with the glass film 11 is manufactured.

The glass film 11 is not particularly limited, and an appropriate material may be selected according to the purpose. According to the classification regarding the composition, the glass film 11 includes, for example, soda lime glass, borate glass, aluminosilicate glass, and quartz glass. Moreover, according to the classification regarding the alkaline component, the glass film 11 includes, for example, alkali-free glass and low alkali glass. The content of the alkaline metal component of the above-described glass (e.g. $Na_2O$, $K_2O$, $Li_2O$) is preferably 15 wt. % or less, and more preferably 10 wt. % or less.

The thickness of the glass film 11 is preferably within a range from 30 μm to 150 μm, more preferably within a range from 50 μm to 140 μm, further preferably within a range from 70 μm to 130 μm, and especially preferably within a range from 80 μm to 120 μm. When the thickness is within the above-described ranges, the glass film composite 10 which is excellent in flexibility, possible to be processed by a roll-to-roll process, and excellent in productivity according to the robustness of the glass film 11 is obtained.

The light transmittance of the glass film 11 at the wavelength of 550 nm is preferably 85% or more. The refractive index of the glass film 11 at the wavelength of 550 nm is preferably within a range from 1.4 to 1.65.

The density of the glass film 11 is preferably within a range from 2.3 g/cm$^3$ to 3.0 g/cm$^3$, and more preferably within a range from 2.3 g/cm$^3$ to 2.7 g/cm$^3$. When the density is within the above-described ranges, it is possible to provide the glass film composite 10 which can contribute to the reduction of weight of the image display device.

The molding method of the glass film 11 is not particularly limited, and an appropriate method can be selected according to the purpose. Typically, the glass film 11 can be prepared by melting a mixture containing a main raw material such as silica or alumina, a defoaming agent such as mirabilite or antimony oxide, and a reducing agent such as carbon, at a temperature within a range from 1400° C. to 1600° C., forming into a shape of sheet, and cooling the mixture. Suitable methods of the glass film 11 may include, for example, a slot down draw method, a fusion method, and a float method. The glass film formed into a plate shape according to the above-described method, may be chemically polished with a solvent such as fluoric acid, as necessary, in order to make the glass film thinner or enhance the smoothness.

The width Lt of the resin tape 12 is, for example, within a range from 3 mm to 100 mm. The width Lt of the resin tape 12 and the width Lg of the glass film 11 preferably satisfy a relation of 10≤Lg/Lt≤200. When the widths have the above-described relation, it is possible to effectively suppress a crack in the glass film 11.

The resin tape 12 is linearly disposed in the longitudinal direction of the glass film 11 near both ends in the width direction on one side of the glass film 11. That is, at least two resin tapes 12 are provided on the surfaces of the glass film 11. Preferably, the resin tapes 12 have continuous linear shapes. The areas near both ends in the width direction on one side of the glass film 11 refer to two outside areas of the glass film 11 when one side of the glass film 11 is evenly divided into four areas of elongated shapes along the longitudinal direction.

A distance between an outer edge of the resin tape 12 and the end of the glass film 11 in the width direction is preferably 50 mm or less, and may be 0 mm.

The length of the resin tape 12 is preferably 80% or more of the length of the glass film 11, more preferably 90% or more of the length of the glass film 11, and most preferably 100% of the length of the glass film 11. That is, the resin tape 12 is most preferably provided over the entire length of the glass film 11.

The thickness of the resin tape 12 is, for example, within a range from 1 μm to 200 μm. Widths of the resin tapes 12 may be the same or different. The lengths of the resin tapes 12 may be the same or different. The thicknesses of the resin tapes 12 may be the same or different.

The resin tape 12 is provided with the adhesive layer 121, and further provided with a substrate 122 as necessary. The adhesive layer 121 is fixed directly onto the glass film 11. That is, the adhesive layer 121 is fixed onto the glass film 11 without intervening other layers.

The adhesive layer 121 includes any suitable adhesive agent. In the adhesive layer 121, for example, a photocurable adhesive agent or a thermosetting adhesive agent is used. Suitable adhesive agents of the adhesive layer 121 may include, for example, an epoxy-based adhesive agent, a rubber-based adhesive agent, an acrylic-based adhesive agent, a silicone-based adhesive agent, a urethane-based adhesive agent, and mixtures thereof.

The thickness of the adhesive layer 121 is preferably within a range from 1 μm to 50 μm, and more preferably within a range from 5 μm to 30 μm.

The substrate 122 can be formed of any suitable resin. Suitable resins of the substrate 122 may include, for example, polyethylene, polyvinyl chloride, polyethylene terephthalate, polyvinylidene chloride, polypropylene, polyvinyl alcohol, polyester, polycarbonate, polystyrene, polyacrylonitrile, ethylene vinyl acetate copolymer, ethylene-vinyl alcohol copolymer, ethylene-methacrylic acid copolymer, polyamide resin, cellulose, and silicone-based resin.

The thickness of the substrate 122 is, for example, within a range from 2 μm to 200 μm. The width of the substrate 122 is preferably substantially the same as the width of the adhesive layer 121. That is, a difference between the width of the substrate 122 and the width of the adhesive layer 121 is 3 mm or less (preferably, 1 mm or less).

[Bending Direction of the Glass Film Composite]

Figure 2:
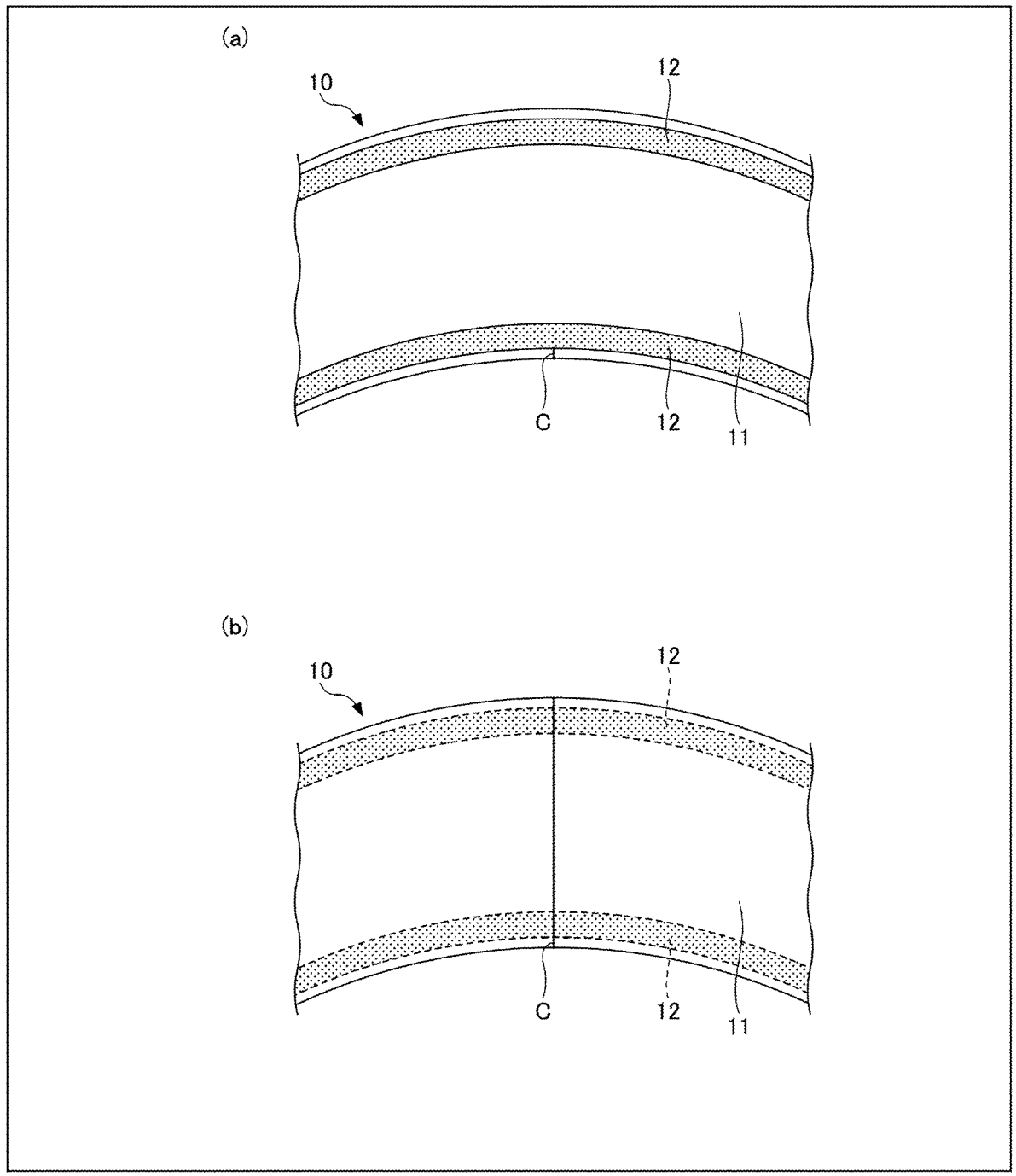
FIG. 2 is a diagram for explaining a bending direction of the glass film composite.

Next, the bending direction of the glass film composite 10 will be described. FIG. 2 is a diagram for explaining the bending direction of the glass film composite, and shows a part of the glass film composite 10.

FIG. 2(a) is a diagram illustrating the glass film composite 10 bent in the longitudinal direction so that the side on which the resin tapes 12 are disposed is convex outward.

An extension of a crack C becomes remarkable on a side to which a tensile stress is applied, and thus the crack C extends remarkably on the side which is convex outward when the glass is bent.

The glass film composite 10 is provided with the linear resin tapes 12 near both ends in the width direction of the glass film 11. Thus, when the glass film composite 10 is bent so that the side on which the resin tapes 12 are disposed is convex outward, even if a crack C occurs at the end in the width direction of the glass film 11, the resin tape 12 suppresses the extension of the crack C. Thus, the crack C does not extend from the state shown in FIG. 2(a).

On the other hand, FIG. 2(b) is a diagram illustrating the glass film composite 10 bent in the longitudinal direction so that the side on which the resin tapes 12 are disposed is concave inward. As shown in FIG. 2(b), when the glass film composite 10 is bent so that the side on which the resin tapes 12 are disposed is concave inward, if a crack C occurs on the side convex outward, on which the resin tapes 12 are not disposed, the extension of the crack C cannot be suppressed. Thus, the crack C may extend, for example, to the other end in the width direction of the glass film composite 10.

As described above, the glass film composite 10 is provided in a form of a roll. When conveying the glass film composite 10, it is necessary to pay attention to the bending direction of the glass film composite 10. That is, unless special conditions are met, the glass film composite 10 needs to be conveyed in a state where the side on which the resin tapes 12 are disposed is not bent, or in a state where the side on which the resin tapes 12 are disposed is convex outward. Thus, even if a crack C occurs at the end in the width direction of the glass film 11, the resin tape 12 suppresses the extension of the crack C.

[Method of Conveying Glass Film Composite]

Figure 3:
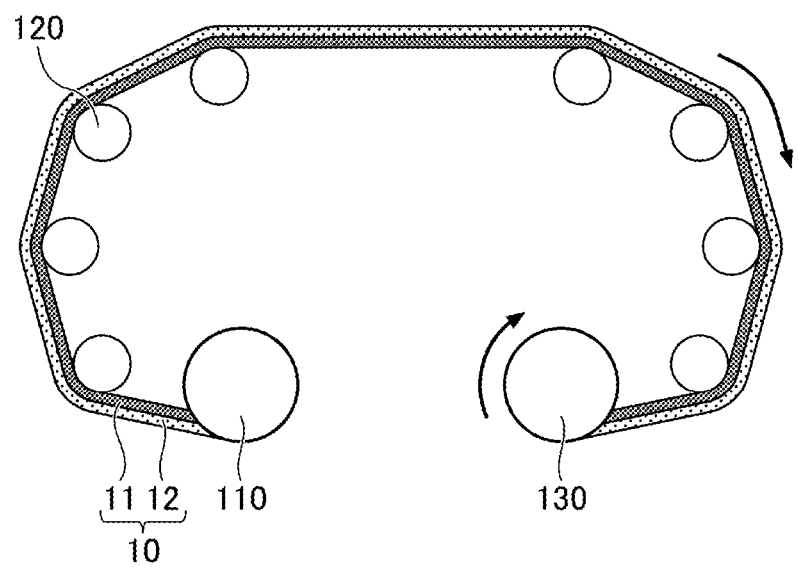
FIG. 3 is a diagram schematically depicting an example of a conveyance device for a glass film composite according to a first embodiment.

Next, a method of conveying the glass film composite 10 will be described. FIG. 3 is a diagram illustrating a conveyance device for conveying a glass film composite according to the first embodiment. Referring to FIG. 3, the conveyance device 100 is a device for conveying an elongated glass film composite 10 in a roll-to-roll process along the longitudinal direction.

The conveyance device 100 includes a feed roller 110 for feeding the glass film composite 10 and a winding roller 130 for winding and collecting the glass film composite 10. The conveyance device 100 also includes a plurality of conveyance rollers 120 between the feed roller 110 and the winding roller 130.

In the process in which the glass film composite 10 is conveyed from the feed roller 110 to the winding roller 130 via the plurality of conveyance rollers 120, a device for attaching other members to a surface of the glass film composite 10, a device for depositing a film on the surface of the glass film composite 10, or the like may be disposed near the conveyance device 100.

A drive motor (not shown) is attached to each of the feed roller 110 and the winding roller 130, and is controlled by a controller (not shown) to rotate in a predetermined direction at a predetermined rotational speed.

Thus, as shown in FIG. 3, the glass film composite 10 wound on the feed roller 110 is wound by the winding roller 130 via the plurality of conveyance rollers 120, and conveyed by the roll-to-roll process. That is, the glass film composite 10 is suspended in the feed roller 110, the conveyance rollers 120, and the winding roller 130, and conveyed in the direction of an arrow.

In FIG. 3, the glass film composite 10 is wound on the feed roller 110 in the state where the glass film composite 10 is bent so that the side on which the resin tapes 12 are disposed is convex outward. Moreover, the glass film composite 10 is wound on the winding roller 130 in the state where the glass film composite 10 is bent so that the side on which the resin tapes 12 are disposed is convex outward.

In FIG. 3, all the conveyance rollers 120 convey the glass film composite 10 while bending the resin tape 12 so that the resin tapes are directed to the outside (the side not contacting the conveyance rollers 120). However, the conveyance device 100 may include a conveyance roller for conveying the glass film composite 10 without bending the resin tape 12 inward or without bending the resin tape 12 outward (e.g. a conveyance roller disposed to support the resin tape 12). Moreover, the conveyance device 100 may be provided with the conveyance roller for conveying the glass film composite 10 without bending the resin tape 12 inward or without bending the resin tape 12 outward on a side of the glass film composite 10 opposite to the conveyance roller 120.

As described above, in the conveyance device 100, during the process of conveying the glass film composite 10 from the feed roller 110 to the winding roller 130 via the plurality of conveyance rollers 120, the glass film composite 10 is conveyed without being bent so that the side on which the resin tapes 12 are disposed is concave inward.

According to the above-described configuration, as described with reference to FIG. 2(a), even if a crack C occurs at the end in the width direction of the glass film 11, the resin tape 12 suppresses the extension of the crack C. As a result, since the resin tape 12 suppresses a propagation of breakage originating from the crack C occurring at the end in the width direction of the glass film 11, it is possible to suppress breakage of the glass film 11 when the glass film composite 10 is conveyed in the roll-to-roll process.

That is, it becomes possible to convey a glass film composite 10 having a length that was conventionally difficult to be continuously manufactured or processed (e.g. 500 m or more) by the roll-to-roll process, while suppressing breakage of the glass film 11.

Second Embodiment

In a second embodiment, an example of a method of conveying a glass film composite, which is different from the method in the first embodiment will be described. In the second embodiment, description of the same component previously described in the first embodiment may be omitted.

Figure 4:
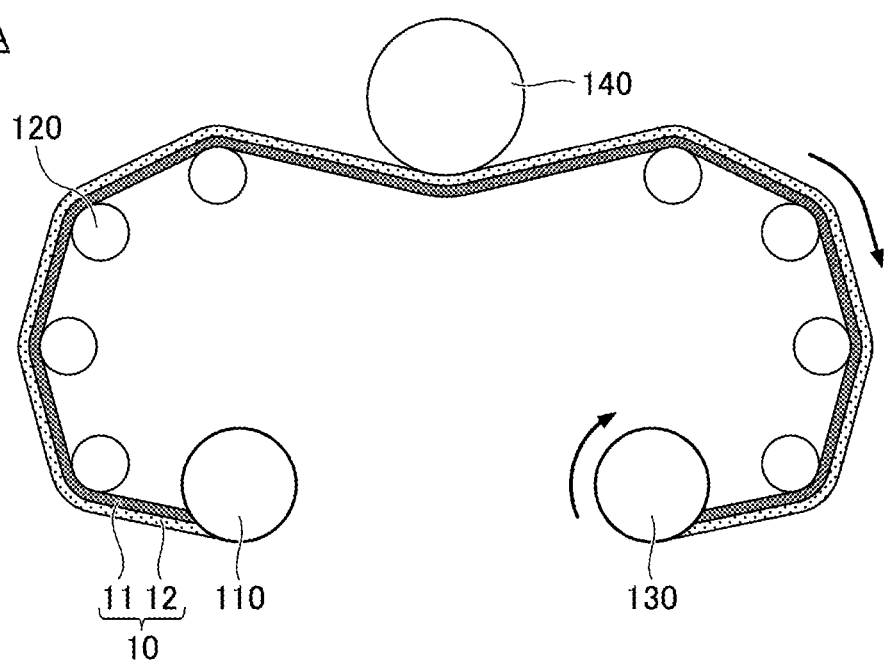
FIG. 4 is a diagram schematically depicting an example of a conveyance device for a glass film composite according to a second embodiment.

FIG. 4 is a diagram illustrating a conveyance device for conveying a glass film composite according to the second embodiment. Referring to FIG. 4, the conveyance device 100A is a device for conveying an elongated glass film composite 10 in a roll-to-roll process along the longitudinal direction.

The conveyance device 100A differs from the conveyance device 100 (see FIG. 3) in that the conveyance device 100A has a conveyance roller 140 disposed on a side of the glass film composite 10 opposite to the conveyance rollers 120 (on the side contacting the resin tape 12).

In FIG. 4, in the same manner as in FIG. 3, the glass film composite 10 is wound on the feed roller 110 in the state where the glass film composite 10 is bent so that the side on which the resin tapes 12 are disposed is convex outward. Then, the glass film composite 10 is wound on the winding roller 130 in the state where the glass film composite 10 is bent so that the side on which the resin tapes 12 are disposed is convex outward.

In the conveyance device 100A, in the same manner as the conveyance device 100 illustrated in FIG. 3, all conveyance rollers 120 convey the glass film composite 10 while bending the resin tape 12 so that the resin tapes are directed to the outside. The conveyance device 100A may include, in the same manner as the conveyance device 100 illustrated in FIG. 3, a conveyance roller for conveying the glass film composite 10 without bending the resin tape 12 inward or without bending the resin tape 12 outward (e.g. a conveyance roller disposed to support the resin tape 12). Moreover, the conveyance device 100A may be provided with the conveyance roller for conveying the glass film composite 10 without bending the resin tape 12 inward or without bending the resin tape 12 outward on a side (on the side of the conveyance roller 140) of the glass film composite 10 opposite to the conveyance roller 120.

The conveyance device 100A, different from the conveyance device 100 illustrated in FIG. 3, includes a conveyance roller 140 for conveying the glass film composite 10 bending the glass film composite 10 at a predetermined holding angle so that the resin tapes are directed to the inside. That is, when the glass film composite 10 passes the conveyance roller 140, the glass film composite 10 is bent so that the side on which the resin tapes 12 are disposed is concave inward. According to the above-described discussion with reference to FIG. 2(*b*), when the glass film composite 10 passes through the conveyance roller 140, the resin tape 12 cannot suppress the extension of the crack C, thus the conveyance roller 140 may be disadvantageous for suppressing breakage of the glass film 11.

However, the inventors of the present application have found that the glass film 11 can be stably conveyed without breaking, even when the glass film composite 10 is bent so that the side on which the resin tapes 12 are disposed is concave inward, provided predetermined requirements are met. The findings by the inventors will be described with reference to FIG. 5.

Figure 5:
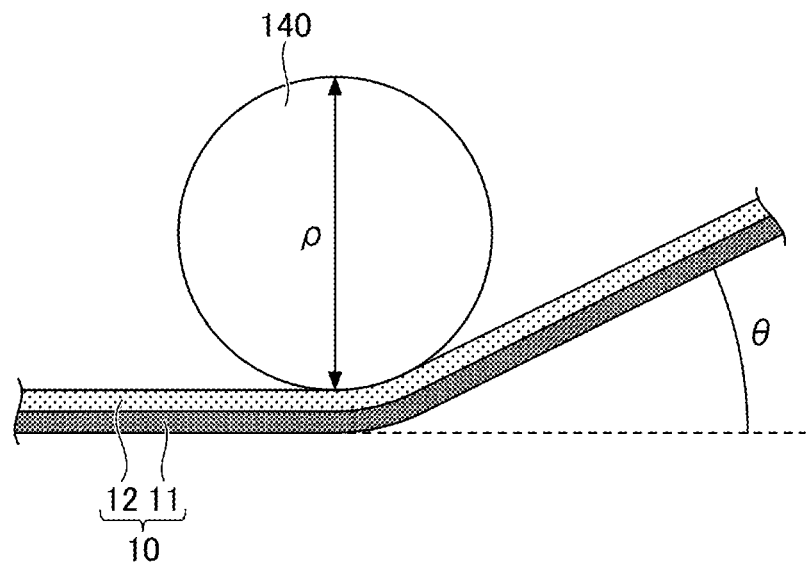
FIG. 5 is an enlarged view of a conveyance roller 140.

FIG. 5 is an enlarged view of the conveyance roller 140. FIG. 5 shows that the glass film composite 10 is conveyed to the conveyance roller 140 having a diameter ρ (mm). When the glass film composite 10 passes through the conveyance roller 140, the glass film composite 10 is bent so that the side on which the resin tapes 12 are disposed is concave inward. At this stage, the holding angle is θ (degrees).

The holding angle is an angle formed by an extension line (a dashed line in FIG. 5) of a conveying direction of the glass film composite 10 immediately before reaching the conveyance roller 140 and a conveying direction of the glass film composite 10 immediately after the glass film composite 10 leaves the conveyance roller 140.

The inventors have found that when the diameter ρ (mm) of the conveyance roller 140, the holding angle θ (degrees), and the thickness t (μm) of the glass film 11 satisfy the relation expressed by formula (1), even if the glass film composite 10 is bent so that the side on which the resin tapes 12 are disposed is concave inward, the glass film 11 can be stably conveyed without breaking. The above-described relation is from the inventors' knowledge based on their experiences.

[Math 1]

$$\rho \geq \frac{7}{30}\left(2 \tan\left(\frac{\theta}{180} - \frac{1}{2}\right)\pi\right)t \quad (1)$$

In the example shown in FIG. 4, the glass film composite 10 is bent so that the side on which the resin tapes 12 are disposed is concave inward at only one site passing through the conveyance roller 140. However, the conveyance device 100A may include a plurality of sites at which the glass film composite 10 is bent so that the side on which the resin tapes 12 are disposed is concave inward satisfying the relation expressed by formula (1).

Third Embodiment

In a third embodiment, an example of a method of conveying a glass film composite, which is different from the method in the first embodiment will be described. In the third embodiment, description of the same component previously described in the first and second embodiments may be omitted.

Figure 6:
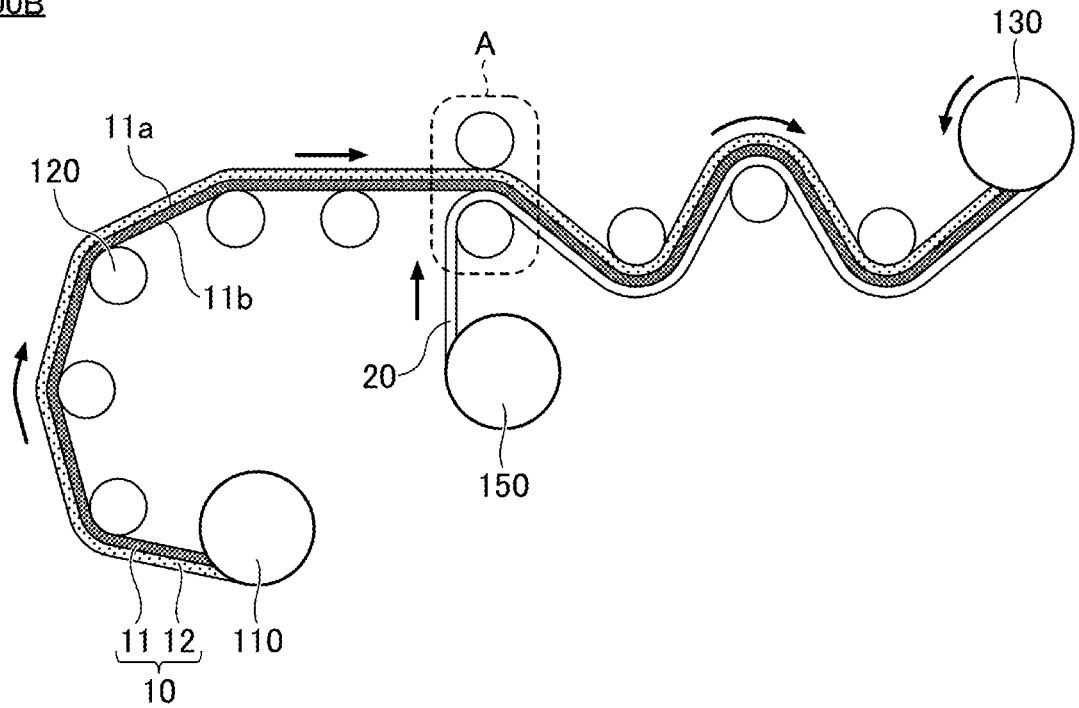
FIG. 6 is a diagram schematically depicting an example of a conveyance device for a glass film composite according to a third embodiment.

FIG. 6 is a diagram illustrating a conveyance device for conveying a glass film composite according to the third embodiment. Referring to FIG. 6, the conveyance device 100B is a device for conveying an elongated glass film composite 10 in a roll-to-roll process along the longitudinal direction.

The conveyance device 100B differs from the conveyance device 100 (see FIG. 3) in that the conveyance device 100B further includes a feed roller 150 for feeding a resin film 20 and laminates the resin film 20 on a second side 11*b* of the glass film 11 of the glass film composite 10 opposite to the first side 11*a* on which the resin tapes 12 are disposed.

FIG. 6 shows that, as in FIG. 3, the glass film composite 10 is wound on the feed roller 110 in the state where the glass film composite 10 is bent so that the first side 11*a* on which the resin tapes 12 are disposed is convex outward. However, different from the embodiment shown in FIG. 3, the glass film composite 10 is wound on the winding roller 130 in the state where the glass film composite 10 is bent so that the first side 11*a* on which the resin tapes 12 are disposed is concave inward. The resin film 20 is laminated on the second side 11*b* of the glass film 11 in the part indicated by "A" in FIG. 6.

In the conveyance device 100B, in the process of conveying the glass film composite 10 from the feed roller 110 to the part "A" through the plurality of conveyance rollers 120, in the same manner as the conveyance device 100 shown in FIG. 3, the respective conveyance rollers 120 convey the glass film composite 10 while bending the resin tape 12 so that the resin tapes are directed to the outside or without bending the resin tape 12 inward or without bending the resin tape 12 outward.

That is, in the conveyance device 100B, in the process of conveying the glass film composite 10 from the feed roller 110 to the part "A" through the plurality of conveyance rollers 120, the glass film composite 10 is conveyed without being bent so that the side on which the resin tapes 12 are disposed is concave inward.

However, in the conveyance device 100B, different from the conveyance device 100 illustrated in FIG. 3, in the process of conveying the glass film composite 10 from the part "A" to the winding roller 130 through the plurality of conveyance rollers 120, bending the resin tape 12 so that the resin tapes are directed to the outside and bending the resin tape 12 so that the resin tapes are directed to the inside are both present.

This is because, after the resin film 20 is laminated on the second side 11*b* of the glass film 11 in the part "A", the resin film 20 has the same effect as the resin tape 12. Thus, even when the glass film composite 10 is bent so that the side on which the resin tapes 12 are disposed is concave inward, the extension of the crack C is suppressed by the resin film 20.

That is, after the resin film 20 is laminated on the glass film composite 10, the bending direction of the glass film composite 10 is not limited to the direction so that the resin tapes are directed to the outside. The glass film composite 10 can be conveyed while bending in any direction. The resin film 20 may be laminated to cover the entire width of the glass film 11 on the second side 11*b* of the glass film 11, or the width of the resin film may be greater than the width of the glass film 11. Alternatively, the width of the resin film 20 may be less than the glass film 11, if the resin film 20 with the width has the same effect as the resin tapes 12, and if the width satisfies the condition for a width used in a final product.

As described above, in the process of conveying the glass film composite 10 from the feed roller 110 to the winding roller 130 through the plurality of conveyance rollers 120, the resin film 20 may be laminated on the second side 11b of the glass film 11 opposite to the first side 11a on which the resin tapes 12 are disposed. After the resin film 20 is laminated on the glass film 11, the glass film composite 10 may be bent so that the side on which the resin tapes 12 are disposed is convex outward or may be bent so that the side on which the resin tapes 12 are disposed is concave inward. In any case of bending directions, an extension of a crack occurring in the glass film 11 is suppressed.

As described above, preferred embodiments or the like have been described in detail. However, the present invention is not limited to the above-described embodiments or the like, and various modifications and replacements may be made for the above-described embodiments without departing from the scope of the present invention recited in claims.

For example, a form of the glass film composite to which the conveyance methods according to the embodiments are applied is not limited to the form illustrated in FIG. 1, if a resin film is disposed on one side of the glass film. For example, the following forms may be included.

For example, on one side of the glass film, two regions may be defined along the longitudinal direction, and two linear resin tapes may be provided near both ends in the width direction of each of the regions. Thus, in the glass film composite, four linear resin tapes are disposed on one side of the glass film in total as shown in FIG. 1(c).

In this case, when the glass film on which two regions are defined is divided into two parts in the width direction as necessary, two elongated glass film composites each provided with resin tapes near both ends in the width direction are obtained.

The number of resin tapes disposed on one side of the glass film may be greater than four. However, the number of resin tapes is preferably an even number. When an even number of resin tapes are disposed on one side of the glass film, by dividing the glass film in the width direction as necessary, described as above, a plurality of elongated glass film composites each provided with resin tapes near both ends in the width direction are obtained.

The present international application claims the priority based on Japanese Patent Application No. 2019-066164, filed Mar. 29, 2019, and the entire content of Japanese Patent Application No. 2019-066164 is incorporated herein by reference.

REFERENCE SIGNS LIST

10 Glass film composite
11 Glass film
12 Resin tape
20 Resin film
100,100A,100B Conveyance device
110,150 Feed roller
130 Winding roller
120,140 Conveyance roller
121 Adhesive layer
122 Substrate

The invention claimed is:

1. A method of conveying a glass film composite using a roll-to-roll process for winding a glass film composite wound on a feed roller by a winding roller through a plurality of conveyance rollers, wherein
the glass film composite includes an elongated glass film, and linear resin tapes disposed on one side of the glass film along a longitudinal direction of the glass film at both ends in a width direction of the glass film, another side of the glass film being uncovered, and
the method includes a step of conveying the glass film composite from the feed roller to the winding roller through the plurality of conveyance rollers, a concave surface of the glass film composite which is not covered by the resin tapes being faced to the conveyance rollers.

2. The method of conveying a glass film composite according to claim 1, wherein
the resin tape is provided with an adhesive layer, and
the adhesive layer is disposed directly on the glass film.

3. The method of conveying a glass film composite according to claim 1, wherein
four or more resin tapes are disposed on one side of the glass film.

4. The method of conveying a glass film composite according to claim 1, wherein
a thickness of the glass film is greater than or equal to 30 μm, and less than equal to 150 μm.

5. A method of conveying a glass film composite using a roll-to-roll process for winding a glass film composite wound on a feed roller by a winding roller through a plurality of conveyance rollers, wherein
the glass film composite includes an elongated glass film, and linear resin tapes disposed on one side of the glass film along a longitudinal direction of the glass film at both ends in a width direction of the glass film,
the conveyance rollers include a first conveyance roller that conveys the glass film composite, a concave surface of the glass film composite which is not covered by the resin tapes being faced to the first conveyance roller, and a second conveyance roller that conveys the glass film composite, a concave surface of the glass film composite which is covered by the resin tapes being faced to the second conveyance roller, and
a diameter of the second conveyance roller ρ (mm), the predetermined holding angle θ (degrees), and a thickness of the glass film t (μm) satisfy a relation $$\rho \geq \frac{7}{30}\left(2\,\tan\!\left(\frac{\theta}{180} - \frac{1}{2}\right)\!\pi\right)\!t.$$

6. The method of conveying a glass film composite according to claim 5, wherein
the resin tape is provided with an adhesive layer, and
the adhesive layer is disposed directly on the glass film.

7. The method of conveying a glass film composite according to claim 5, wherein
four or more resin tapes are disposed on one side of the glass film.

8. The method of conveying a glass film composite according to claim 5, wherein
a thickness of the glass film is greater than or equal to 30 μm, and less than equal to 150 μm.

* * * * *